United States Patent [19]

Liepa

[11] 3,998,975
[45] Dec. 21, 1976

[54] POTATO CHIP PRODUCTS AND PROCESS FOR MAKING SAME

[75] Inventor: Alexander L. Liepa, Montgomery, Ohio

[73] Assignee: The Procter & Gamble Company, Cincinnati, Ohio

[22] Filed: Aug. 2, 1974

[21] Appl. No.: 493,821

Related U.S. Application Data

[63] Continuation of Ser. No. 62,175, Aug. 7, 1970, abandoned, which is a continuation of Ser. No. 724,662, March 18, 1968, abandoned, which is a continuation-in-part of Ser. No. 581,925, Sept. 26, 1966, abandoned.

[52] U.S. Cl. ............................. 426/550; 426/560; 426/637; 426/441; 426/446; 426/456; 426/457; 426/808

[51] Int. Cl.$^2$ ......................................... A23L 1/10

[58] Field of Search ... 426/343, 346, 372, 438–441, 426/549, 550, 560, 637, 445, 446, 455, 456, 457, 808

[56] References Cited

UNITED STATES PATENTS

| | | | |
|---|---|---|---|
| 3,282,704 | 8/1968 | Fritzberg | 426/441 |
| 3,297,450 | 1/1967 | Loska | 426/441 |
| 3,396,036 | 8/1968 | Liepa | 426/637 |

FOREIGN PATENTS OR APPLICATIONS 985,808  3/1965  United Kingdom

Primary Examiner—Norman Yudkoff
Assistant Examiner—Martin G. Mullen
Attorney, Agent, or Firm—Louis G. Xiarhos

[57] ABSTRACT

A potato chip product and process wherein a dough is prepared from dehydrated cooked potatoes and water and subsequently fried. The dough has an iodine index of from about 0.01 to about 6 and a lipid content of from 0 to about 6%, by weight.

11 Claims, 1 Drawing Figure

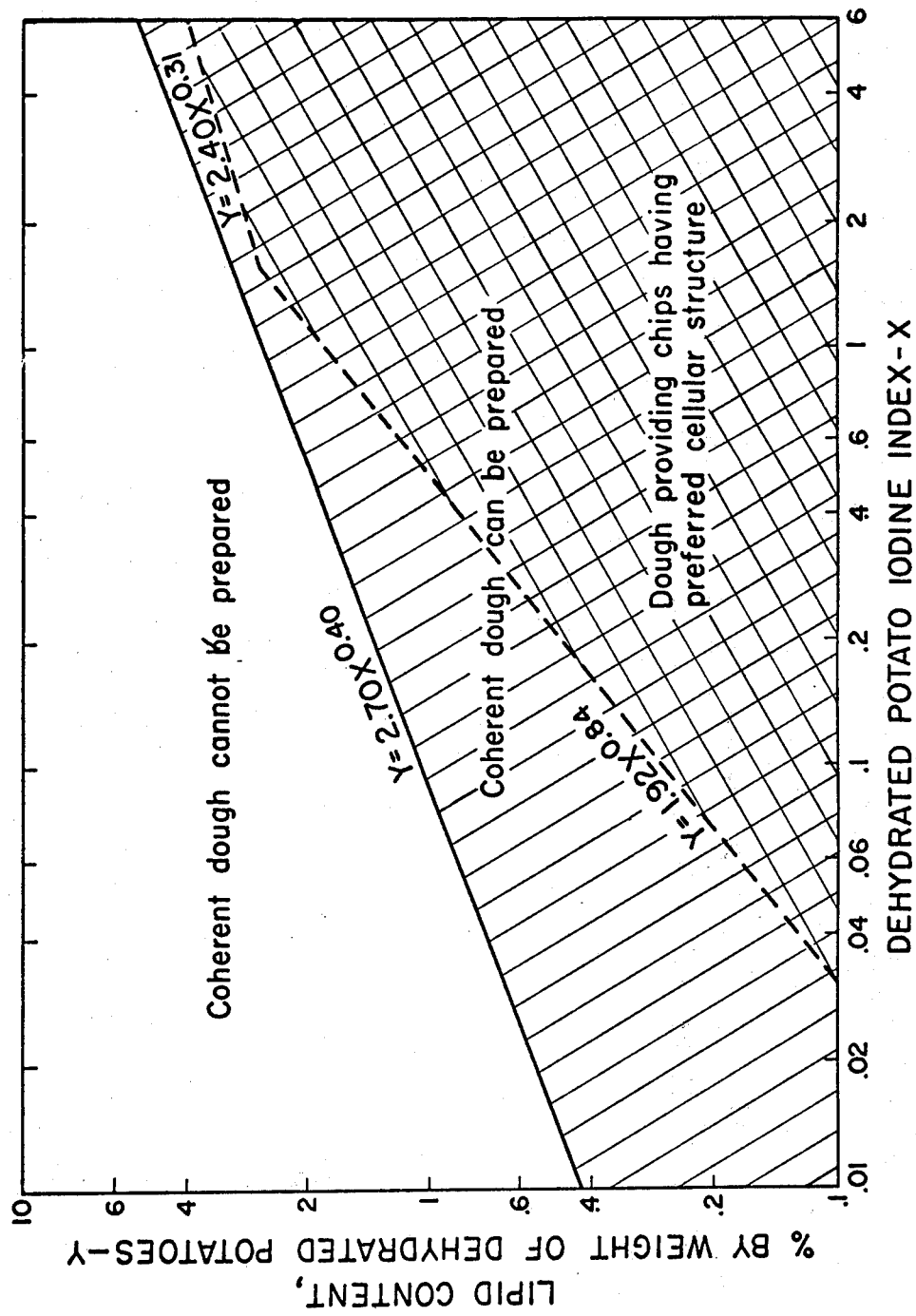

POTATO CHIP PRODUCTS AND PROCESS FOR MAKING SAME

CROSS-REFERENCE TO RELATED APPLICATIONS

This application is a continuation of copending application Ser. No. 62,175, filed Aug. 7, 1970 now abandoned, which is a continuation of now-abandoned application Ser. No. 724,662, filed Mar. 18, 1968, which in turn is a continuation-in-part of now-abandoned application Ser. No. 581,925, filed Sept. 26, 1966.

BACKGROUND OF THE INVENTION

This invention relates to crisp, tasty, fried, formulated potato chip products prepared from a dough comprising dehydrated cooked potatoes and water, and to a process for making formulated potato chip products.

Conventional potato chips are prepared by deep fat frying thin slices of peeled raw potatoes. The raw potatoes must be stored in an unpeeled and unsliced condition until they are to be processed because the cut surfaces of the raw potatoes tend to darken as a result of the reaction of the enzymes in the potatoes with air. In addition, the potatoes must be stored under controlled temperature conditions so that they do not develop sprouts and so that the reducing sugar content can be maintained at a low level to prevent premature or excessive browning of the potatoes when they are deep fat fried. The chips which result from frying slices of raw potatoes can be quite variable since there is considerable variation between potatoes of different varieties in terms of their flavor, reducing sugar content, and potato solids content, each of which has an important effect on the flavor and appearance of the fried chips. Additionally, chips so prepared must be fried for from about 1 to about 3 minutes, a not inconsiderable time period, and the resulting chips have a rather high fat content of from about 35% to about 50%, by weight.

Heretofore it has been proposed to eliminate or minimize the foregoing handling problems and variations in the appearance of potato chips by making a homogeneous mixture of potato solids and water suitable for deep fat frying by either reducing the particle size of raw potatoes or by using dehydrated cooked potatoes to form a dough. These methods have generally included the addition to the dough of binder materials to form a supporting gel so that the product will maintain its shape during subsequent stages of processing. They have also required drying the homogeneous mixture to a low moisture level suitable for subsequent frying. For example, Markakis et al. in U.S. Pat. No. 3,027,258, granted Mar. 27, 1962, disclose a method of producing a synthetic, chip-type product from a mixture of precooked instant dried potatoes, dry vital gluten, gelatinized waxy maize, fat (in the form of shortening or oil), and chilled water. These ingredients are admixed to form a dough which is shaped and then fried. The dry vital gluten and gelatinized waxy maize, which are non-potato ingredients, comprise over 50% of the dry component of the dough and the resulting product thus has less of the desirable potato flavor than it would if the dry component was based on substantially 100% potatoes. The dough formed has a moisture content of between 30%–100% of the dry ingredients, by weight. After being cut into pieces of the desired shape for frying, the cut pieces are dried to reduce their moisture content to below 15%, presumably to allow the cut pieces to maintain their shape during frying. The drying step requires additional equipment, thereby increasing the processing cost.

Similarly, Backinger et al. in U.S. Pat. No. 3,085,020, granted Apr. 9, 1963, teach a method of making a french fried potato product by using dehydrated cooked mashed potatoes which have been rehydrated. A necessary ingredient of the composition is methyl cellulose, which is added to the potato-water mixture to bind the potato solids together during deep fat frying. It has been deemed desirable to eliminate the need for non-potato binder ingredients to provide a formulated potato chip based substantially completely on potatoes.

In addition to the patents discussed above, British Patent 608,996 also discloses the use of binders in connection with mixtures of dehydrated cooked potatoes and water. The teachings of that patent are general in nature and apparently do not provide a product that closely resembles conventional potato chips in appearance, texture, flavor, and eating quality.

SUMMARY OF THE INVENTION

Briefly stated, the present invention provides a process for preparing formulated potato chips which comprises intimately admixing dehydrated cooked potatoes with water to form a dough, forming the dough into shaped pieces, and frying the pieces until they are crisp. The invention also provides the potato chip products which result from carrying out this process. The dehydrated cooked potatoes must have an iodine index (a measure of the concentration of free starch) of from about 0.01 to about 6. The lipid content of the dough is also important and is defined by the relationship $Y = AX^{0.40}$, where Y is the lipid content of the dough in percent by weight of dehydrated cooked potatoes, X is the iodine index of the dehydrated cooked potatoes which ranges from about 0.01 to about 6, and A is equal to or less than 2.70. A dough which can be shaped and fried to a crisp, tasty state resembling conventional potato chips made by frying slices of raw potatoes cannot be made unless the iodine index of the dehydrated cooked potatoes and the lipid content of the mixture conform to this relationship. The dehydrated cooked potatoes are intimately admixed with water to form a coherent, workable, potato-based dough having a total water content of from about 25% to about 55% by weight. The dough is formed into pieces of the desired shape without drying and the pieces are deep fat fried to provide crisp, tasty potato chips.

This invention provides an improved, formulated potato chip product which is made from a dough comprising dehydrated cooked potatoes and water and which closely resembles, e.g., in appearance, texture, flavor and eating quality, conventional potato chips made from slices of raw potato.

This invention also provides a process for preparing deep fat fried potato chips from a dough which comprises dehydrated potatoes and water, without drying the dough prior to the deep fat frying step, and without adding to the dough any non-potato ingredients to act as binders as the prior art teaches.

Furthermore, the present invention provides a potato chip having a fat content of only from about 15% to about 35% as compared with the 35% to 50% fat of conventional chips, and provides a chip that can be fried for from about 5 to about 60 seconds, preferably from about 5 to about 25 seconds, as compared with the 1 to 3 minutes required to fry conventional chips.

BRIEF DESCRIPTION OF THE DRAWING

In the accompanying drawing, the relationship between the lipid content of the mixture in percent by weight of dehydrated cooked potatoes and the iodine index of the dehydrated cooked potatoes is presented graphically and shows the combinations of lipids and iodine indices suitable for preparing coherent doughs from which chips can be made.

DESCRIPTION OF THE PREFERRED EMBODIMENTS

A unique feature of this invention is that it is not necessary to incorporate various additives such as binders, colorants and flavoring agents into the chips since the chips which result from practicing this invention have the flavor, texture, color, and eating qualities of conventional potato chips made by deep fat frying slices of raw potatoes. Furthermore, the chips produced according to the present invention contain from about 15% to about 35% frying fat compared with conventional chips which generally contain from about 35% to about 50% frying fat. This difference provides significant advantages for chips of the present invention in that they are less greasy and have a lower caloric content than conventional chips.

The dehydrated cooked potatoes (hereinafter "dehydrated potatoes") used in the present invention can be either in flake, granular, or powdered form (potato flour). These dehydrated potato products are made by drying cooked mashed potatoes. The flakes can be made according to a number of known processes, including those described in U.S. Pat. Nos. 2,759,832, 2,780,552, and 2,787,553. The granules can also be made according to known processes, including those described in U.S. Pat. Nos. 2,490,431 and 2,520,891. Potato flour is made by drum drying cooked mashed potatoes to a thin sheet which is then ground to the desired fineness.

Dehydrated potato flakes typically have a moisture content of about 7% by weight. The potato cells in the flakes are substantially intact and thus there is a minimum of free starch. Various stabilizers and preservatives are usually present in the flakes in small quantities to improve the stability and texture of the flakes. For example, from about 150 to about 200 parts per million (ppm) of sulfite is provided in the dry product. This is added to the wet mash, usually as sodium sulfite and sodium bisulfite, and protects the flakes from darkening during processing and subsequent storage. Antioxidants such as BHA (2 and 3-tert-butyl-4-hydroxyanisole) and BHT (3,5-di-tert-butyl-4-hydroxytoluene) are added in amounts up to a total of about 10 ppm to prevent oxidative deterioration. Sodium acid pyrophosphate is added in the amount of from about 0.05% to about 0.10% to prevent after-cooking darkening of the flakes. Citric acid is generally added in a quantity sufficient to provide about 90 ppm in the dried product to prevent discoloration caused by the presence of ferrous ions. Monoglycerides, such as glycerol monopalmitate or glycerol monostearate, are also added to the wet mash prior to drying and in amounts ranging from about 0.4% to about 1% by weight to improve the texture of the reconstituted mash.

Dehydrated potatoes in granular form have a moisture content of about 6% by weight and are composed of substantially unicellular potato particles which have their cell walls intact and which are capable of passing through about a No. 60 to about a No. 80 U.S. series sieve. The granules also have sulfite added to reduce darkening, the amount of sulfite in the finished product usually comprising between about 200–400 ppm of sulfite in the form of sodium sulfite and sodium bisulfite. Antioxidants such as BHA and BHT are added in amounts not exceeding 10 ppm of both to prevent oxidative deterioration.

Potato flour is made by drying cooked mashed potatoes to a moisture level of about 6% by weight and grinding the dry product to a given particle size, generally from about 70 to about 180 microns. Unlike the dehydrated potato flakes and granules described above, however, potato flour is composed of substantially 100% ruptured potato cells.

Although any of the above-described forms of dehydrated potatoes (i.e., flakes, granules, or flour) can be used in practicing this invention if they meet the free starch content requirement, dehydrated potatoes having a reducing sugar content between 0% and about 5.0% by weight, preferably between 0% and 2.0% by weight, must be employed to maintain the desired light color in the fried chips since an excessive reducing sugar content adversely increases the rate of browning of the chip product. While the reducing sugar content is dependent upon that of the potatoes which were employed to prepare the dehydrated potato product, the amount of reducing sugar in the dehydrated product can be increased by adding suitable amounts of reducing sugars such as glucose, maltose, lactose, and the like. The reducing sugar content of the dehydrated potatoes can be decreased, if desired, by hydrating the potatoes and separating the solution from the solids. The solution will contain at least part of the reducing sugars. In extracting the excess reducing sugar in this manner some of the soluble starch will also be extracted and it may therefore be necessary to rupture at least a part of the potato cells to provide free starch to replace that which was extracted. If, in the course of frying, the chips reach the desired color too quickly because of too high a reducing sugar content, the characteristic flavor of the chips will not be sufficiently developed because the frying time to reach the desired color is less than would be the case if the reducing sugar content were lower.

Any dehydrated potatoes prepared from high quality potatoes can be used in this invention including Kennebec, Russet Burbank, Idaho Russet, and Sebago potatoes, which are among the varieties that have been found to provide a good flavor in the final potato chip product.

The iodine index of the dehydrated potatoes, which is a measure of the available free starch, is one of the critical factors in preparing a dough and it also has a significant influence on the texture of the chip which results from frying the dough. To determine the iodine index of a sample of dehydrated cooked potatoes, distilled water at room temperature is added to a quantity of the dehydrated potatoes and the mixture is gently stirred for about 30 minutes in a constant temperature bath at 50° C to completely wet the sample and hydrate the free starch. The sample is centrifuged for 10 minutes at a relative centrifugal force of about 1450 g (where g is the acceleration due to gravity) to separate the undissolved potato solids from the solution. The resulting clear starch solution is decanted through a glass wool plug to filter out any solids. The starch solution is then diluted to 10% of its initial concentration by adding distilled water. Equal volumes of diluted starch solution and a dilute $KI_3$ solution prepared in the manner described below are intimately intermixed to form a homogeneous solution. A separate solution comprising equal volumes of distilled water and the dilute $KI_3$ solution is similarly prepared and is used as a blank. The two solutions are then placed in a spectrophotometer, such as a Beckman Model B with blue phototube or equivalent, and the absorbance of the homogeneous starch solution in relation to that of the blank solution is obtained at a wavelength of 610 millimicrons using cells of 1 cm. thickness. If the absorbance is greater than 0.5 or less than 0.05 the dilution of the starch solution is adjusted by adding either additional starch solution or additional distilled water to provide an absorbance between those values. The iodine index of the sample is calculated by dividing the absorbance value so obtained by the final concentration of the starch solution in terms of grams of initial dehydrated potato sample per liter of solution.

A stock $KI_3$ solution is prepared by dissolving 3.8 grams of ACS grade KI and 2.54 grams of $I_2$ in one liter of distilled water. The stock $KI_3$ solution is then diluted for use by adding 475 milliliters of distilled water to 25 milliliters of the stock solution to form the dilute $KI_3$ solution.

Dehydrated potatoes having an iodine index of from about 0.01 to about 6 can be used to prepare a dough suitable for making formulated potato chips. Preferably, however, the iodine index of the dry component of the dough is from about 0.03 to about 6 in order to provide the tender eating quality which results from chips having a multiplicity of individual, expanded air cells throughout the chip structure. Dehydrated potatoes which do not have iodine indices within the required range but have the other necessary attributes as hereinafter discussed can be made suitable for use in the present invention by pulverizing or grinding at least a part of the dehydrated potatoes in a hammermill or other suitable comminuting device to rupture at least some of the potato cells and thereby provide free starch, which is reflected by an increase in the iodine index of the dehydrated potatoes.

In addition to providing an iodine index within the range required to form a coherent dough, rupture of the potato cells in dry form by passing the dehydrated potatoes through a comminuting device also improves the flavor of the fried product. The degree of improved flavor so obtained is directly related to the degree to which the potato cells have been ruptured and once an iodine index within the dough-forming range is obtained, further cell rupture can be provided to additionally improve the flavor of the ultimate product. Thus, although a satisfactory product can be formed by limited comminution simply to provide an iodine index within the critical dough-forming range, it is preferred for flavor purposes that the dehydrated potatoes be comminuted to an extent that the iodine index is increased by at least 50%, most preferably 100%, to a value within the range of from about 0.01 to about 6. Although the reason for the flavor improvement so obtained is not definitely known, it is theorized that one or more flavor constituents within the potato cells may by virtue of the cell rupture be made more readily available for reaction to provide the characteristic potato chip flavor.

Another critical factor which affects both the ability to prepare a dough and the eating qualities (especially those other than flavor) of the fried chips is the lipid content of the dehydrated potato-water mixture. The lipid content of dehydrated potatoes is usually well below about 1% but it can be increased (when desired) to any higher level by the addition of a suitable amount of fatty substances such as, for example, mono-, di-, and triglycerides of fatty acids, such as monopalmitin, monostearin, monoolein, dipalmitin, and tripalmitin, and partial fatty esters of glycols, such as propylene glycol monostearate and monobehenate. The lipid can be added to the dehydrated potatoes or it can be added to the water. It is important, however, that the lipid be uniformly dispersed in whichever component it is mixed. The maximum lipid content of the dough is about 6% by weight of the dehydrated potatoes for an iodine index of about 6.

The relationship between the lipid content and the iodine index and their effect on the fried chips is shown in the accompanying graph. When the dehydrated potato-water mixture has a lipid content and the dehydrated potatoes have an iodine index which together define a point above the solid line, a coherent, workable dough suitable for forming a thin sheet cannot be made and the dehydrated potato-water mixture does not form a coherent mass. A satisfactory dough sheet can be made when the lipid content of the mixture and the iodine index of the dehydrated potatoes defines a point on or below the solid line. Such a dough sheet, when cut to provide thin, small, bite-sized pieces, can be fried to provide a tasty, crisp, chip-like food product which has a distinct potato chip flavor.

For a given iodine index, decreasing the lipid content of the dehydrated potato-water mixture provides more tender chips. The tender eating quality results from the formation of a multiplicity of air cells within the chip during the frying operation. While chips which do not have a cellular structure are satisfactory from the standpoints of taste and texture, chips having some degree of air cell development are preferred because of their more tender eating quality. Chips having the preferred cellular structure, and thus the desired tender eating qualities, can be prepared with dehydrated potato-water mixtures having lipid contents and iodine indices which define points on or below the dashed lines on the graph.

The relationship between the lipid content and the iodine index as represented by the solid line in the accompanying graph is expressed mathematically as follows:

$$Y = 2.70 \ X^{0.40}$$

where
$Y$ = dehydrated potato-water lipid content in percent by weight of dehydrated potatoes, and
$X$ = dehydrated potato iodine index which ranges from about 0.01 to about 6.

The general relationship between lipid content and iodine index defining the dehydrated potato properties necessary to form a coherent dough sheet suitable for making fried chips is $$Y = A \ X^{0.40}$$

where
$A \leq 2.70$

This relationship defines the area under the solid line in the accompanying graph.

The area under the dashed lines in the graph defines the lipid contents and iodine indices which provide coherent doughs and which when fried result in chips having the preferred air cell development. This area is defined by the following relationships:

For
$$X \leq 1.5,$$
$$Y = B X^{0.84}$$

where
$$B = 1.92$$

for
$$X \geq 1.5$$
$$Y = C X^{0.31}$$

where
$$C \leq 2.40$$

Two equations are necessary to define this area because of the discontinuity in the dashed line at an iodine index of 1.5

The water added to the dehydrated potato component of the mixture is preferably heated, but water which is at room temperature can also be used. The water and dehydrated potatoes are uniformly mixed in, for example, a Hobart vertical, planetary, paddle mixer until the water is evenly dispersed throughout the dough and the potatoes have been uniformly rehydrated. Heated water results in a dough which is easier to roll into thin sheets. Preferably the dough is at a temperature of from about 80° F to about 170° F before it is rolled into sheets. The total moisture content of the dough (including the moisture content of the dehydrated potatoes) can range from about 25% to about 55% by weight and is preferably from about 35% to about 45% by weight to provide a dough which can be easily rolled into thin sheets. Although commercially available dehydrated potatoes have about 7% moisture, dehydrated potatoes having from 0% to about 20% moisture are also suitable.

After the dough is prepared it can be formed into suitable shapes which can be deep fat fried to provide the potato chip products of the present invention. The sizes and shapes of the chips into which the dough can be formed are endlessly variable. A conventional potato chip made from a slice of raw potato can be very closely simulated by passing the dough between spaced mill rolls to form a sheet of dough ranging in thickness from about 0.005 inch to about 0.1 inch, and preferably from about 0.007 inch to about 0.02 inch. The dough sheet so formed can be cut into elliptical pieces having the approximate size and shape of sliced potatoes and then fried in conventional chip frying apparatus. Alternatively, apparatus such as that described in the co-pending application of Alexander L. Liepa, entitled "Method of and Apparatus for Preparing Chip-Type Products," Ser. No. 683,083, filed Oct. 31, 1967, can be used to produce uniformly shaped chips.

In order to provide potato chips of the present invention which have a surface conformation and shape similar to conventional chips made by frying thin slices of raw potatoes, it is preferred that the frying be performed with the chips constrained between a pair of closely-fitting, similarly configured shaping molds which have apertures to permit the hot frying fat to come into intimate contact with the dough. The aforementioned copending patent application describes one form of suitable shaping molds. Although the dough formulations herein described are particularly suited for preparing molded chips by constraining them during the frying operation, it is not necessary that the frying be performed with the dough in a constrained condition and satisfactory chips can be produced by passing unconstrained cut dough pieces through hot frying fat.

The frying operation can be carried out with the frying fat at a temperature of from about 275° F to about 400° F, but is preferably performed at a fat temperature of from about 315° F to about 375° F. Any edible cooking oil or shortening is a suitable medium for frying the chips. While conventional chips made from sliced raw potatoes require a frying time of from about 1 to about 3 minutes, chips of the thickness above disclosed and made according to the present invention can be fried in from about 5 to about 60 seconds, preferably from about 5 to about 25 seconds. The principal factor which influences the frying time is the color of the fried chip, which is primarily a function of the reducing sugar content of the dehydrated potatoes. Among the other factors which affect chip color are the thickness of the chip, the temperature of the frying oil, and the type of oil used.

It will be apparent to one skilled in the art that various other ingredients can be included in the dough prepared according to the present invention. For example, emulsifiers, flavor imparting substances, colorants, preservatives, antioxidants, and the like can be added but are not necessary.

The following examples of the invention, while not intended to be taken as limiting the scope thereof, will serve to illustrate the compositions of and the processes for making the potato chips of the present invention. Unless otherwise indicated in the examples, all percentages are based on weight. In all the examples, the iodine indices and lipid contents of the dehydrated potato-water mixtures define points on or below the solid line on the accompanying graph and obey the relationship $Y = AX^{0.40}$, where $Y$ is the dehydrated potato-water mixture lipid content in percent by weight of dehydrated potatoes, $X$ is the dehydrated potato iodine index, and $A$ is less than or equal to 2.70.

EXAMPLE 1

628 grams of dehydrated cooked potato flakes having an average reducing sugar content of about 1.5% were pulverized in a Model PB-5A Waring Blender for 8 minutes at the high speed setting to provide pulverized flakes having an iodine index of 1.47, with the particles having a maximum size capable of passing through a No. 50 U.S. series sieve. The flakes contained 5.3% water, 0.8% lipid, and a total of about 0.2% of sodium acid pyrophosphate, sodium sulfite, citric acid, BHA, and BHT. 4.6 grams of lipid in the form of commercially available mono-, di-, and triglycerides were added to 367.4 grams of boiling water in a suitable vessel. The mono-, di-, and triglycerides were prepared by superglycerinating soybean oil to obtain a mixture of mono-, di-, and triglycerides comprising about 40% monoglycerides, about 40% diglycerides, and about 20% triglycerides and having an Iodine Value of 65. The lipid was permitted to melt in the boiling water, which was agitated by hand stirring the mixture for about one minute to completely disperse the added material. The pulverized flakes were intimately intermixed with the water/mono- and diglyceride mixture in a Hobart Model C-100 vertical, planetary paddle mixer by slowly adding the boiling water/mono- and diglyceride mixture to the pulverized dehydrated potatoes to provide a dough having a total moisture content of 40%. The combination was intimately blended at a mixer speed of 60 rpm for four minutes to completely rehydrate the potatoes and form a workable dough. The lipid content of the combination was 1.52% based on the weight of the dehydrated potatoes and the mono-, di-, and triglycerides. The dough so formed was at a temperature of 115° F and was passed between the rolls of a two-roll mill, which had 12-inch diameter chromeplated steel rolls spaced to provide a coherent, easy to handle dough sheet which had a thickness of 0.012 inch. The dough sheet was immediately cut into substantially elliptical pieces which had a major diameter of about 3.0 inches and a minor diameter of about 2.0 inches. The pieces were then deep fat fried for 7 seconds in a cottonseed-based frying oil which was maintained at a temperature of 350° F. The resulting fried product was a tasty, crisp, chip-type food product which was then salted uniformly over one surface to provide a chip having 2% salt. The taste, texture, color, eating quality, and appearance of the product resembled that of conventional potato chips made by frying sliced raw potatoes but had a fat content of about 25% as compared with about 40% fat typical of conventional potato chips.

When the amount of water in the dough of the above example is adjusted to produce doughs having total moisture contents of 25% and 55% by weight and the resulting dough is sheeted, cut, fried, and salted as described above, substantially similar results are obtained in that the resulting chips resemble conventional potato chips which have been deep fat fried.

When propylene glycol monostearate is substituted for the mono-, di-, and triglyceride mixture of Example 1, substantially similar results are obtained in that the resulting chips resemble potato chips made by deep fat frying slices of raw potato.

The following examples were prepared as described in Example 1 by pulverizing dehydrated potato flakes and adding various amounts of lipid. The resulting dough was formed into sheets, cut into pieces, and fried as in Example 1. The handling properties of the dough sheet are characterized as tough, good, fair, sticky, tender, fragile, and poor in descending order of ease of handling of the thin sheet. The degree of air cell development in the fried chips is characterized as good, slight, and none, in descending order.

TABLE I

| | Dehydrated Potatoes | | | | Dough | | | |
|---|---|---|---|---|---|---|---|---|
| Example | % Lipid | % Water | Iodine Index | Added Lipid (grams) | % Lipid | Weight of Dehydrated Potatoes (grams) | Weight of Water (grams) | Dough Sheet Handling Properties | Air Cell Development in Fried Chips |
| 2 | 0.8 | 5.3 | 1.47 | 11.2 | 2.55 | 622 | 366.8 | Good | Good |
| 3 | 0.8 | 5.3 | 1.47 | 7.6 | 2.45 | 626 | 366.4 | Good | Good |
| 4 | 0.8 | 5.3 | 1.47 | 14.4 | 3.05 | 618 | 367.6 | Fair | None |
| 5 | 0.2 | 4.9 | 5.13 | — | 0.20 | 630 | 370 | Tough | Good |
| 6 | 0.2 | 4.9 | 5.13 | 5.1 | 1.00 | 624.9 | 370 | Sticky | Good |
| 7 | 0.2 | 4.9 | 5.13 | 30.3 | 5.00 | 599.7 | 370 | Poor | None |
| 8 | 0.2 | 4.9 | 5.13 | 27.1 | 4.50 | 602.9 | 370 | Fragile | None |
| 9 | 0.2 | 4.9 | 5.13 | 24.0 | 4.00 | 606 | 370 | Fragile | None |
| 10 | 0.2 | 4.9 | 5.13 | 17.7 | 3.00 | 612.3 | 370 | Tender | Good |

EXAMPLES 11 and 12

The following Examples represent the dehydrated potato and dough conditions for chips that were prepared as described in Example 1. Pulverization of the dehydrated potatoes was performed in a hammermill comminuting device to provide two different degrees of cell rupture as indicated by the iodine index and the chips prepared from these doughs were fried for 11.2 seconds at 360° F:

TABLE II

| | DEHYDRATED POTATOES | | | | DOUGH | | |
|---|---|---|---|---|---|---|---|
| EXAMPLE | % Lipid | % Water | Iodine Index (After Pulverization) | Added Lipid (grams) | % Lipid | Weight of dehydrated potatoes (grams) | Weight of Water (grams) |
| 11 | 0.8 | 10.2 | 0.74 | 0.30 | 0.78 | 301.7 | 196.8 |
| 12 | 0.8 | 7.5 | 1.98 | 0.76 | 1.24 | 299.4 | 196.8 |

The resulting chips were of excellent color, texture, eating quality, and appearance.

Although the present invention has been described and illustrated with reference to specific examples, it will be apparent to those skilled in the art that various changes and modifications can be made without departing from the spirit and scope of the invention and it is intended to cover in the appended claims all such changes and modifications that are within the scope of this invention.

What is claimed is:

1. A process for preparing a potato chip of tender eating quality characterized by a multiplicity of individual expanded air cells, said chip being made from a dough comprising dehydrated cooked potatoes and water, said process comprising the steps of: adjusting the iodine index and adjusting the lipid content of said dehydrated potatoes to provide a lipid content and an iodine index which are defined by points within the cross-hatched area of FIG. 1, intimately admixing water with said dehydrated cooked potatoes to form a coherent workable dough comprising from 25% to 55% water by weight, said dough being free of non-potato binder materials, forming said dough into chip-like pieces, and frying said pieces until they are crisp.

2. The process of claim 1 wherein said dough has a water content of from 35% to 45% by weight.

3. The process of claim 1 wherein the iodine index of said dehydrated potatoes is adjusted by comminuting said dehydrated potatoes in dry form.

4. The process of claim 3 wherein the lipid content of said dehydrated potatoes is adjusted by adding lipid to said dehydrated potatoes.

5. The process of claim 1 wherein the lipid content of said dehydrated potatoes is adjusted by adding lipid to said dehydrated potatoes.

6. A process of preparing a potato chip of tender eating quality characterized by a multiplicity of individual expanded air cells, said chip being made from a dough comprising dehydrated cooked potatoes and water, said process comprising: adjusting the iodine index and the lipid content of said dehydrated potatoes to provide a lipid content and an iodine index which are defined by points within the cross-hatched area of FIG. 1, intimately admixing water with said dehydrated cooked potatoes to form a coherent workable dough comprising from 25% to 55% water by weight, said dough being free of non-potato binder materials, rolling said dough into a flat sheet, forming said flattened sheet into shaped pieces, and frying said flattened dough pieces until they are crisp.

7. The process of claim 6 wherein said dough has a water content of from 35% to 45% by weight.

8. A process for preparing a potato chip of tender eating quality characterized by a multiplicity of individual expanded air cells, said chip being made from a dough comprising dehydrated cooked potatoes and water, said process comprising the steps of: adjusting the iodine index of said dehydrated potatoes, intimately admixing water with said dehydrated cooked potatoes to form a coherent workable dough comprising from 25% to 55% water by weight, adjusting the lipid content thereof by adding lipid to said dough to provide a lipid content and an iodine index therein which are defined by points within the cross-hatched area of FIG. 1, said dough being free of non-potato binder materials, forming said dough into chip-like pieces, and frying said pieces until they are crisp.

9. The process of claim 8 wherein the iodine index of said dehydrated potatoes is adjusted by comminuting said dehydrated potatoes in dry form.

10. The potato chip product produced by the process of claim 1.

11. The potato chip product produced by the process of claim 8.

* * * * *